United States Patent [19]
Carpenter et al.

[11] 3,873,749
[45] Mar. 25, 1975

[54] PROCESS FOR PRODUCING A FISH PRODUCT
[75] Inventors: Roland Paul Carpenter, Stonehaven; Richard Braid Weddle, Aberdeen, both of Scotland; Francis William Wood, Bedford, England
[73] Assignee: Lever Brothers Company, New York, N.Y.
[22] Filed: June 29, 1973
[21] Appl. No.: 375,268

[30] Foreign Application Priority Data
July 3, 1972   United Kingdom.............. 3104/72

[52] U.S. Cl................. 426/350, 426/169, 426/212, 426/364
[51] Int. Cl. ............................................ A23j 3/00
[58] Field of Search ......... 99/14, 18, 111, 107, 108, 99/109, 110; 260/112; 426/167, 212, 350, 224, 364

[56] References Cited
UNITED STATES PATENTS
3,017,273   1/1962   Marvin et al. .......................... 99/18

Primary Examiner—Raymond N. Jones
Assistant Examiner—R. A. Yoncoskie
Attorney, Agent, or Firm—Lever Brothers Company

[57] ABSTRACT

A foodstuff in the form of a thermostable gel containing a characterising protein ingredient, particularly a fish protein, is obtained by admixing at a pH above 7 the protein ingredient and a propylene glycol ester of alginic acid so that a water-insoluble protein-alginate polymer is formed.

5 Claims, No Drawings

PROCESS FOR PRODUCING A FISH PRODUCT

The present invention relates to protein-containing products for use as foodstuffs. More particularly, it relates to shaped freeze-thaw stable and thermostable alignate gel products containing a characterising protein ingredient.

Although from the following description it will be apparent that the invention is particularly applicable to the manufacture of products wherein the characterising protein ingredient is derived from fish, it is to be understood that similar products can be prepared from crustacea. Hereinafter the expression "fish protein ingredient" is used to refer to any protein material derived from fish or from crustacea. Moreover, the invention may be applied to the use of protein material derived from other animal sources, such as animal or poultry muscle, milk or eggs.

The invention is especially beneficial in the utilisation of protein material having a low functionality, i.e., protein material which has become substantially denatured due to treatment such as heating or protein concentration or extraction procedures. The invention enables such substantially denatured protein to be reconstituted into foodstuffs suitable for human consumption.

We have now discovered that it is possible to provide freeze-thaw stable, thermostable gels containing a protein ingredient which are well suited for use in frozen foodstuffs.

According to the invention, there is provided a foodstuff in the form of a thermostable gel which comprises a polymer of a protein ingredient and a propylene glycol ester of alginic acid.

The invention also provides a process for preparing a foodstuff, which process comprises mixing at a pH above 7 a protein ingredient and a propylene glycol ester of alginic acid, thereby to provide a water-insoluble protein-alginate polymer in the form of a thermostable gel.

The protein ingredient, as we have stated, can be derived from any edible proteinaceous material and, for reasons of economy, can most usefully be derived from protein sources which would normally require refining before consumption and which would otherwise constitute protein-containing waste material destined for animal feeds, agricultural fertilisers or for other industries.

In the frozen fish industry, for example, it has long been recognised that there is considerable and unavoidable wastage of fish protein, especially that which remains attached to the heads and frames of fresh or frozen fish which have been filleted. Much of the fish which remains after fillets have been removed is inedible as such, but it can be used in the glue industry or for the manufacture of animal foodstuffs or fertilisers or other commodities of low commercial value.

Considerable effort has been directed during recent years into the recovery and refining of "waste" fish protein to enable it to be used in the manufacture of human foodstuffs. By way of example, purified fish protein (otherwise known as fish flour or fish protein concentrate) can now be obtained from fish waste by any of several methods which are summarised by Julius Brodie in his review of "Fish By-Products Technology" published by AVI Publishing Co. Inc. in 1965 at page 209. The preparation of a superior quality fish protein concentrate, which is a particularly suitable protein ingredient for use according to the present invention, is described in the complete specification of British Pat. application Ser. No. 52153/71.

It is to be understood that the protein ingredient need not necessarily be purified or refined, provided that it is safe for consumption. For example, alternative sources of fish protein ingredient can consist of coarsely or finely comminuted fish muscle which has not been subjected to any protein extraction technique. Thus it is possible to use finely comminuted fish muscle having an average length of less than 2 mm, or, alternatively, it is possible to use coarsely comminuted fish muscle having an average length of greater than 2 mm. In the latter case, the protein ingredient can comprise a proportion of fish muscle fibres or fibre bundles of, for example, from 2 – 15 mm in length and up to 2 mm in diameter; this fibrous tissue can usefully be employed in imparting a natural fibrous texture to the product of the invention, as well as providing the necessary fish character.

Suitable propylene glycol esters of alginic acid are soluble esters which may conveniently be prepared by reacting a food-grade alginic acid with 1,2-propylene oxide.

The propylene glycol alginic acid esters may still contain free carboxyl groups. It is, however, advantageous for economic reasons to use propylene glycol alginic acid esters wherein at least 50 percent of the carboxyl groups of the alginic acid are esterified.

The foodstuff prepared according to the invention may also contain other ingredients, such as edible salts, flavouring agents and colouring matter and texturising aids as desired.

The foodstuff of the invention may be prepared by first making a mixture of the protein ingredients and the ester of alginic acid, ensuring that the pH of the mixture is greater than 7, sufficient water being added when necessary to facilitate mixing and to allow polymerisation to proceed, provided that the quantity of water added is not so great that the mixture becomes so fluid that the formation of discrete structures by extrusion is impossible.

Ideally, the mixture should contain from about 15–30 percent by weight of fish protein solids and from 0.6 – 2.5 percent by weight of the ester of alginic acid, the actual proportions being selected according to the nature of the ingredients and the texture of the thermostable gel to be produced.

According to a particularly preferred embodiment of the invention, the mixture contains from 17 to 25 percent by weight of dry powdered fish protein concentrate, 0.6 to 2.0 percent by weight of propylene glycol ester of alginic acid, the balance, apart from minor ingredients such as salts, colouring and flavouring matter and texturising aids, being water; the pH is adjusted at the time the mixture is prepared to a value of from 7.5 to 9.5.

The mixture can be allowed to set to a thermostable gel without further treatment, or it can be used as a component of a food product by admixing with other ingredients before or after setting. Alternatively, before it sets the mixture can be shaped to a thermostable gel by extrusion.

Setting after extrusion can be facilitated by contacting the extruded mixture with an aqueous solution of an alkaline material, such as sodium carbonate, sodium hydroxide or mixtures thereof, the use of a sodium carbonate solution being preferred. The mixture can thereby be converted rapidly to a thermostable gel of the required shape, which may, for example, be in the form of filaments, fibres, hollow fibres, tubes, rods or strips. For example, filaments of up to 5 mm in diameter, or ribbons up to 5 mm thick, can be produced. The preferred diameter or thickness of the extruded thermostable gel foodstuff is 0.75 mm.

After setting it may be necessary to reduce the pH of the gel foodstuff to a more appropriate level. Ideally the final pH of the gel foodstuff should be about 5 to 8, although the use of slightly higher pH may be acceptable. The pH of the gel foodstuff may be reduced by washing with a dilute aqueous solution of an acid such as acetic acid or hydrochloric acid, and then removing extraneous fluid by, for example, centrifuging. Generally the concentration of the acid in the aqueous solution will be from 0.5 to 5 percent w/v, but the concentration chosen may depend upon the strength of the particular acid used, and the degree of alkalinity of the gel foodstuff.

Ideally the gel foodstuff should contain a level of moisture comparable to that of fresh fish muscle, i.e., about 80 percent by weight in the case of white fish muscle. However, the gelled product may contain a moisture level of 90 percent by weight, or more, after extrusion. The moisture content will be reduced somewhat by any acid washing used to alter the pH, as described above. Nevertheless, such acid washing may not be sufficient to reduce the moisture content to a desired level, or may not be required anyway for pH reasons. An alternative method of reducing the moisture content is to dip the gelled product after setting into dilute brine for a short period of time, generally not exceeding 5 minutes, and then removing extraneous fluid by, for example, centrifuging. A combination of these techniques may be used if required. Generally the brine should contain from 0.5 to 5 percent w/v salt.

A particular use of the invention according to the preferred embodiment described above is in the manufacture of fish portions, such as fish fingers, fish steaks, fish cakes or fish pie filling, which are intended to be stored in the frozen state until purchased or prepared for consumption. It has been found that up to 15 percent, or more, of cod muscle in these products can be replaced by the gel foodstuff of the invention in fragmented form, for example 2.5 cm long polymerised alginate ester-fish protein fibres 0.5 mm in diameter, or polymerised alginate ester-fish protein flake cut from an extruded ribbon of thermostable gel 16 mm wide and 0.3 – 1.0 mm thick, without detracting substantially from the appearance, texture and flavour of these products.

The fish protein products of the invention can thus find particular utility as foodstuff extenders, or they can be used an analogue foodstuffs in their own right. They reduce the likelihood of syneresis in products containing them, even when thawed from the frozen state, and hence are suitable for use in many types of foodstuffs where water retention on thawing and, where appropriate, on cooking is desirable.

The invention is illustrated by the following Examples.

EXAMPLE 1

This Example illustrates the preparation of flake from fish protein concentrate, which is suitable for inclusion in fish fingers.

An aqueous mixture comprising by weight 22.5 percent decolorised fish protein concentrate (prepared from cod waste by the procedure described in the complete specification of British Pat. application Ser. No. 52153/71), 1 percent propylene glycol ester of alginic acid (sold by Alginate Industries Ltd under the trade name Manucol Ester E/RH2, and wherein 75–80 percent of the carboxyl groups of the alginic acid are esterified) and 76.5 percent water was prepared, acetic acid being added to adjust the pH to about 8.

The mix was de-aerated under vacuum, extruded through a 0.75 mm × 7 mm aperture into a mixture comprising 0.5 M sodium carbonate and 0.2 M sodium hydroxide, the residence time in the solution being not more than 5 seconds, to yield firm ribbons. The ribbons were subsequently adjusted to pH 6 by washing with 1 percent w/v acetic acid, and finally centrifuged to remove residual surface moisture.

The ribbons were chopped into 0.5 – 1.5 cm lengths to simulate flaked fish muscle, and incorporated without further treatment at a level of 15 percent or 30 percent on a wet weight basis into a mix comprising sliced, filleted cod and sodium tripolyphosphate.

The mix was subsequently shaped, frozen and battered to provide fish fingers. The products were shown to be organoleptically indistinguishable from commercially obtainable fish fingers.

EXAMPLE 2

This Example illustrates the preparation from fish protein concentrate of flake which is suitable for inclusion in fish fingers.

An aqueous mixture comprising by weight 22.5 percent decolourised fish protein concentrate (as used in Example 1), 1 percent propylene glycol ester of alginic acid (as used in Example 1) and 76.5 percent water was prepared, acetic acid being added to adjust the pH to about 8.

The mix was de-aerated under vacuum, extruded through a 0.75 mm × 7 mm aperture into a mixture comprising 0.5 M sodium carbonate and 0.2 M sodium hydroxide to yield firm ribbons, the residence time in the solution being not more than 5 seconds. The ribbons were adjusted to a pH value of about 7.0 with dilute (1 percent w/v) acetic acid.

The water content of the ribbons was then reduced by dipping in 2.65 percent w/v salt solution for 60 seconds, and residual surface moisture removed by centrifugation. The salt content of the ribbons prepared in this way was about 1.5 percent by weight.

The ribbons were chopped into 0.5 – 1.5 cm lengths to simulate flaked fish muscle, and incorporated without further treatment at a level of 15 percent or 30 percent on a wet weight basis into a mix comprising sliced, filleted cod and sodium tripolyphosphate.

The mix was subsequently shaped, frozen and battered to provide fish fingers. The products were shown to be organoleptically indistinguishable from commercially obtainable fish fingers.

EXAMPLE 3

This Example illustrates the application of a block technique for subsequent shredding and use in products.

An aqueous mixture comprising by weight 25 percent fish protein concentrate which had been decolourised with alkaline peroxide, 0.8 percent propylene glycol ester of alginic acid (as used in Example 1) and 74.2 percent water was prepared, having a pH of 8.4.

The mixture was placed in a mould and stored at 20° C for 16 hours, when it had set to a firm block.

The block was shredded into flakes which were then adjusted to a pH of 6.0 with 1 percent w/v acetic acid and incorporated as before into fish fingers.

EXAMPLE 4

This Example illustrates the use of added alkali in the block technique described in Example 3.

An aqueous mixture comprising by weight 22.5 percent alkaline decolorised fish protein concentrate, 0.8 percent propylene glycol ester of alginic acid (as used in Example 1), 10.0 percent decinormal sodium hydroxide and 66.7 percent water was prepared, having a pH of 8.95.

The mixture was de-aerated under vacuum, placed in a mould and stored at 3° C for 16 hours, when it had set to a firm block.

The block was shredded into flakes which were then adjusted to a pH of 6.0 with 1 percent w/v acetic acid and incorporated as before into fish fingers.

The simulated fish flakes prepared in accordance with Examples 1 to 4 above can be incorporated into a fish cake at, for example, a level of 20 percent by weight, the fish cake having a composition before battering and breading:

| | |
|---|---|
| Comminuted fish muscle | 25% |
| Simulated fish flakes | 20% |
| Cooked potato | 53% |
| Seasoning | 2% |

EXAMPLES 5 to 7

The following three mixtures were prepared and made up into gelled foodstuffs in accordance with the invention. All percentages are by weight unless otherwise indicated.

EXAMPLE 5

| | |
|---|---|
| Fish protein concentrate[1] | 25% |
| Propylene glycol ester of alginic acid[2] | 2.5% |
| Water | 72% |
| Antifoam[3] | 0.5% |

EXAMPLE 6

| | |
|---|---|
| Saw milk[4] | 86% |
| Fish protein concentrate[1] | 10% |
| 20% w/v aqueous caustic soda solution | 2.5% |
| Propylene glycol ester of alginic acid[5] | 1% |
| Antifoam[3] | 0.5% |

EXAMPLE 7

| | |
|---|---|
| Cooked brown shrimp threshings | 84% |
| Fish protein concentrate[1] | 9% |
| 20% w/v aqueous caustic soda solution | 1.4% |
| Water | 4% |
| Propylene glycol ester of alginic acid[5] | 1.4% |

-Continued

| | |
|---|---|
| Antifoam[3] | 0.2% |

[1] Prepared from cod waste by the procedure described in the complete specification of British Patent Application No. 52153/71.
[2] Sold by Alginate Industries Ltd under the trade name Alginade K, and wherein about 30% of the carboxyl groups of the alginic acid are esterified.
[3] Sold by Hopkins & Williams under the trade name Silicone MS Antifoam A.
[4] Sawing waste from a conventional fish finger production line, and consisting of very finely comminuted fish muscle which is substantially denatured by heating resulting from sawing friction.
[5] Sold by Alginate Industries Ltd under the trade name Manucol Ester E/RH2, and wherein 75-80% of the carboxyl groups of the alginic acid are esterified.

Each mixture was extruded into a bath containing an aqueous solution of 0.5M sodium carbonate and 0.2M caustic soda, and held in the bath for a residence time of 5 seconds. The pH of the extruded material was then adjusted to 6 using 1 percent w/v acetic acid, and extraneous liquid removed. The gelled products were then cooked by indirect steam heating.

Example 5 produced a softer and more pasty gel than that produced in Example 1. The gel of Example 5 was barely satisfactory as a textured foodstuff ingredient.

Example 6 produced a very satisfactory firm white gel.

Example 7 produced a coloured but firm gel suitable for use in a textured foodstuff.

EXAMPLE 8

This Example demonstrates the applicability of the invention to proteinaceous material derived from a source other than fish.

The following mixture was made up into a gel foodstuff using the procedure adopted in Examples 5 to 7. All percentages are by weight unless otherwise indicated.

| | |
|---|---|
| Raw finely-comminuted beef | 90.5% |
| Water | 5% |
| 20% w/v aqueous caustic soda solution | 3% |
| Propylene glycol ester of alginic acid[1] | 1% |
| Antifoam[2] | 0.5% |

[1] Sold by Alginate Industries Ltd under the trade name Manucol Ester E/RH2, and wherein 75-80% of the carboxyl groups of the alginic acid are esterified.
[2] Sold by Hopkins & Williams under the trade name Silicone MS Antifoam A.

The extruded gel foodstuff was cooked by indirect steam heating. The gel foodstuff had a firm chewy fibrous texture.

What is claimed is:

1. A process for the preparation of a protein-containing foodstuff in the form of a thermostable gel, comprising the steps of:

a. admixing an edible protein ingredient and a propylene glycol ester of alginic acid at a pH above 7, said propylene glycol ester being such that at least 50 percent of the carboxyl groups of the alginic acid are esterified;

b. assisting the setting of the mixture of said protein ingredient and said propylene glycol ester by extrusion of said mixture into an aqueous solution of an alkali selected from the group consisting of sodium carbonate and sodium hydroxide and mixtures thereof; and c. adjusting if necessary to a value in the range of 5 to 8 to pH of the thermostable gel so formed, by washing said gel with a dilute aqueous solution of an acid selected from the group consisting of acetic acid and hydrochloric acid, extraneous fluid being removed by centrifuging.

2. A process according to claim 1, wherein said protein ingredient is fish protein.

3. A process according to claim 2, wherein said fish protein is a substantially denatured material.

4. A process according to claim 3, wherein said fish protein is a fish protein concentrate.

5. A process according to claim 4, wherein said mixture consists essentially of, by weight, from 17 to 25 percent of said fish protein concentrate and from 0.6 to 2.0 percent of said propylene glycol ester, the balance of said mixture being predominately water.

* * * * *